Oct. 21, 1952     H. R. FOSTER ET AL     2,615,078

FREQUENCY ANALYZER SYSTEM

Filed Dec. 29, 1949

INVENTORS
HARRY R. FOSTER
ELMO E. CRUMP

ATTORNEY

Patented Oct. 21, 1952

2,615,078

UNITED STATES PATENT OFFICE 2,615,078

FREQUENCY ANALYZER SYSTEM

Harry R. Foster, East Orange, and Elmo E. Crump, West Caldwell, N. J., assignors to Ohmega Laboratories, Pine Brook, N. J.

Application December 29, 1949, Serial No. 135,668

3 Claims. (Cl. 175—183)

This invention relates to improvements in a frequency analyzing system for investigating the frequencies in sounds which are made up of a large number of frequencies. In order to show its application, one illustration is applicable to a large number of others, for example suppose there are two pieces of apparatus operating, one of which is performing its functions satisfactorily while the other generates certain sounds, the location of which is not visible or easily detected and it becomes necessary to investigate these sounds to see what frequency or frequencies are causing the trouble in order to more readily locate the source of the trouble.

Figure 1:
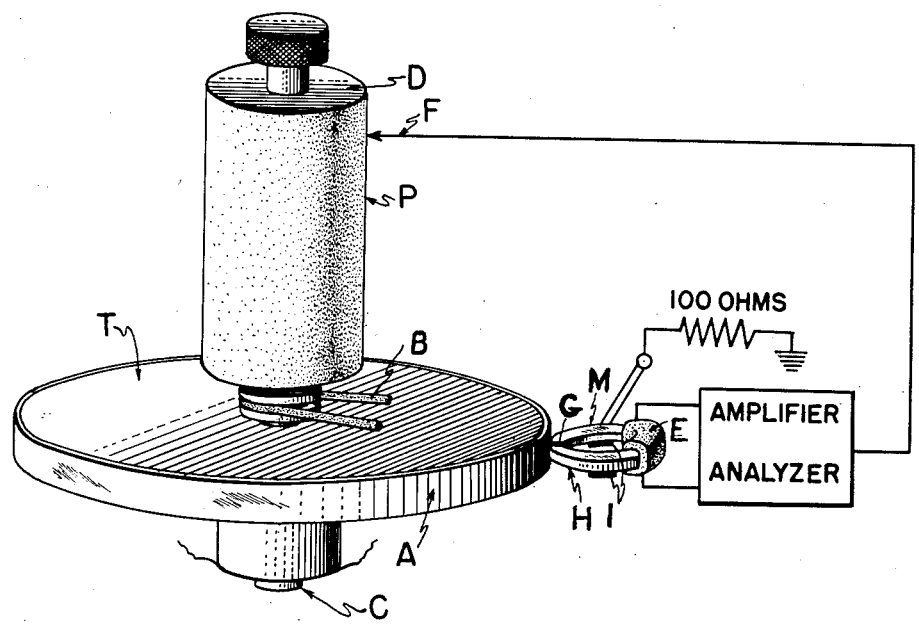

While certain structures have been prepared and used for frequency analysis, it has been found there are many difficulties encountered in the systems so far prepared of which we are aware. A portion of a prior art structure is shown in the annexed drawing wherein Figure 1 shows schematically certain portions of prior art structures and Figure 2 illustrates a record made from the structure shown in Figure 1.

In the drawing D is a drum supported on a shaft C that is adapted to be carried by any satisfactory type of a bearing. On the drum D is attached a sensitized paper P. The drum D is revolved by a belt B driven by another part of the mechanism not shown. The shaft C carries a circular table T on the outer periphery of which is applied a film or thin strip of magnetic material. It is to be understood that the drum D and table T all are preferably made of metallic material. Mounted adjacent the film A is an head or pick-up member H which is composed of an electro-magnet E having arms M, which arcuately extend towards each other and terminate in a small gap G. The ends of the magnetic members M at the gap G are adapted to be moved into contact and operate against the film A. The coil of the electro-magnet E is connected to an amplifier-analyzer which amplifies the voltage generated in the electro-magnet E by reason of the varying flux picked up by the members M from the film A, it being understood that the film A is first subjected to sounds that are brought into it through the analyzer and transmitted to the film by the head H. To analyze the frequency of these sounds that are on the film A, the drum D and table T are rotated together at a speed of about 500 R. P. M. while the finger F is arranged to move the length of the drum D thereby making a complete scan of P in this 500 cycles of R. P. M.'s. As the head H picks up the signals from the film A they are passed from the head H to the analyzer and amplifier and transmitted to the finger F which is in contact with the paper P on the drum D and as the apparatus turns, the finger F is moved as described, up or down along the length of the drum D.

The magnitude of the voltage variations recorded on the tape A give approximately .001 of a volt, and this voltage variation is passed to the amplifier unit, and the output of the voltage from this unit to the finger F is in the order of 150 volts.

Figure 2:
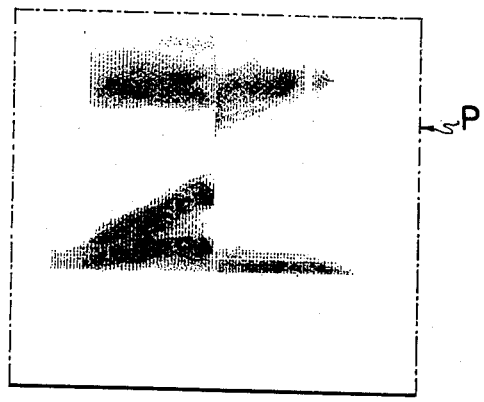

In order that the record may be marked as indicated in Figure 2 as the current passes from the finger F to the drum D, it must be taken care of and not allowed to get back to the amplifier. It is readily understood that if, only a small fraction of the energy at F is passed back through the head H, it will cause oscillations or interferences with the desired signals. This has been one great trouble with analyzing structures heretofore used.

To overcome this trouble we tried several ways, one of which was, to find a lower resistance ground path through the shaft but we found that this was not satisfactory because of the shaft lubrication. We also tried a slip ring attachment to the plate T but this gave trouble due to the table shaft bearing etc.

Then we tried insulating the head H entirely from ground as by insulators I, but this did not take care of the trouble because of electrostatic pick up by the coil E. Finally after further study and experiments we discovered that by putting an impedance preferably in a form of a suitable resistance of about 100 ohms connected between the head H and ground, that this reduced the interference sufficiently to eliminate all of the trouble of a ground at the shaft bearing which is still retained to take as much of the current coming from F as possible.

In order to make our invention more readily understood we have eliminated many of the mechanical parts that go to make up a complete instrument which we term a Sona-graph.

It may be mentioned in passing that in the complete structure another head similar to H is utilized for wiping off any record that may be on the film A, so that another record may be applied thereto as heretofore mentioned. Also it is to be understood that the head H and its companion wiper are mounted on arms to get a complete apparatus that may be quickly and easily shifted into operative position.

Since many of these details form no part of our present invention, it does not seem necessary to

Having thus described our invention what we claim is:

1. In a frequency analyzing system including a circular rotatable table or disc having at least a rim of magnetizable material and a metallic rotatable cylinder extending from the table, said cylinder carrying on its periphery a current sensitive paper with a travelling current conducting finger adapted to move along the length of the cylinder in contact with the paper an electro-magnetic head having slightly spaced pole ends engageable with the said rim to pick up magnetic impulses therefrom, the winding of said electro-magnetic head being connected directly into an amplifier-analyzer the output of which has a connection to said travelling finger and applying hereto a voltage sufficient to impress a permanent record on the paper on said cylinder and means for preventing any feed back from the finger current, in the form of a suitable resistance of relatively low impedance connected between the metal of the head that is in contact with the rim of the plate and ground.

2. A frequency analyzing system as set forth in claim 1 further defined in that the voltage at the finger contact is approximately 150 while the resistance is of the non-inductive type of approximately 100 ohms.

3. In a frequency analyzing system including a circular rotatable table or disc having at least a rim of magnetizable material and a metallic rotatable cylinder extending from the table, said cylinder carrying on its periphery a current sensitive paper with a travelling current conducting finger adapted to move along the length of the cylinder in contact with the paper an electro-magnetic head having slightly spaced pole ends engageable with the said rim to pick up magnetic impulses therefrom, the winding of said electro-magnetic head being connected directly into an amplifier-analyzer the output of which has a connection to said travelling finger and applying thereto a voltage sufficient to make a positive record on the paper on said cylinder and means for preventing any harmful part of the current from the finger, after it makes the record on the paper on the cylinder, from getting back into the amplifier-analyzer, said means including insulating devices for insulating the head and a ground connection to the head through a non-inductive resistance having a resistance around 100 ohms.

HARRY R. FOSTER.
ELMO E. CRUMP.

REFERENCES CITED

The following references are of record in the file of this patent:

UNITED STATES PATENTS

| Number | Name | Date |
| --- | --- | --- |
| 1,852,769 | Collard | Apr. 5, 1932 |
| 2,298,727 | Sherman | Oct. 13, 1942 |
| 2,429,236 | Potter | Oct. 21, 1947 |
| 2,456,592 | Petruschell | Dec. 14, 1948 |
| 2,539,674 | Rhoads | Jan. 30, 1951 |
| 2,557,245 | Zillger | June 19, 1951 |